Figure 1:
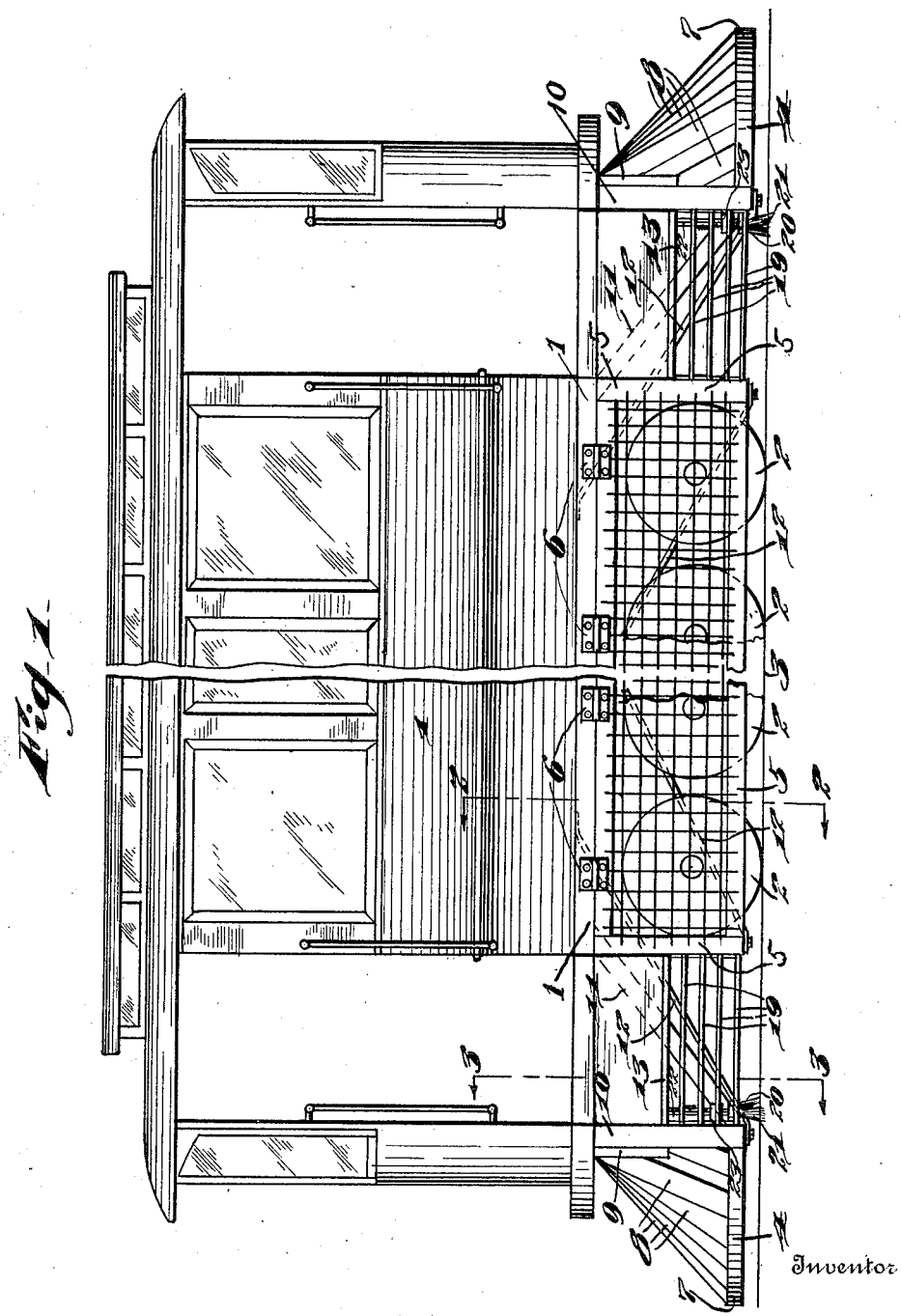

P. F. MATTHEWS.
CAR FENDER.
APPLICATION FILED OCT. 6, 1910.

998,788.

Patented July 25, 1911.

3 SHEETS—SHEET 1.

Witnesses
Thno. Premann.
R. H. Krenkel.

Inventor
Philip F. Matthews,
By Joshua R. H. Potts,
Attorney

P. F. MATTHEWS.
CAR FENDER.
APPLICATION FILED OCT. 6, 1910.
998,788.
Patented July 25, 1911.
3 SHEETS—SHEET 2.
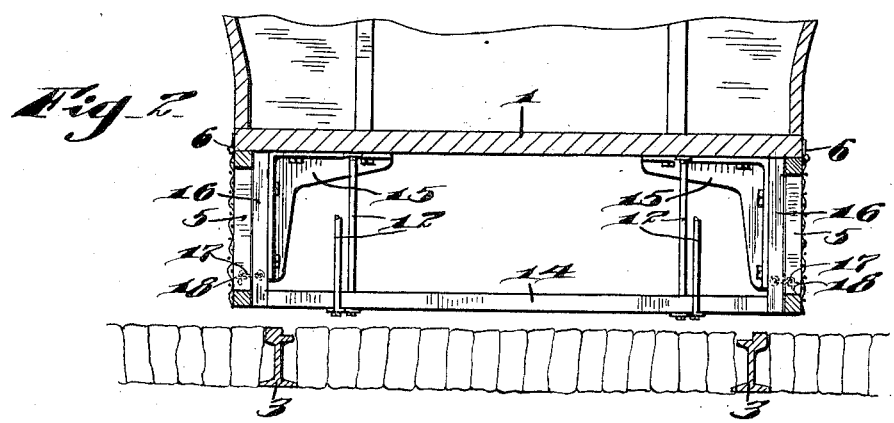
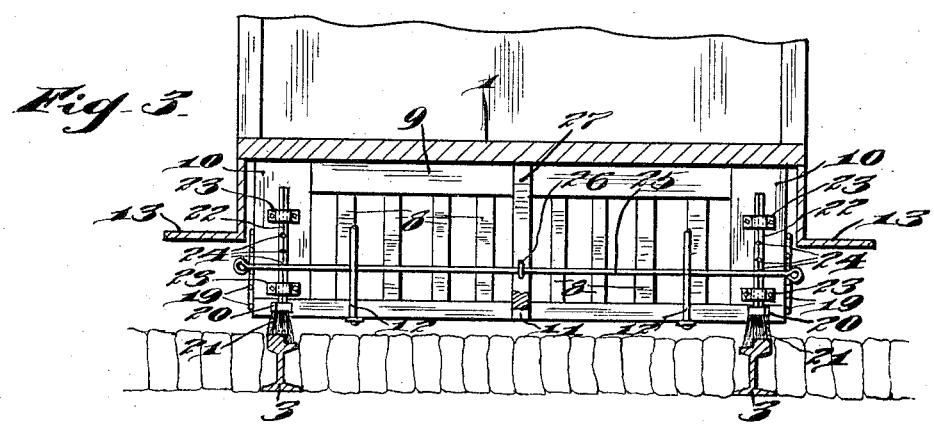
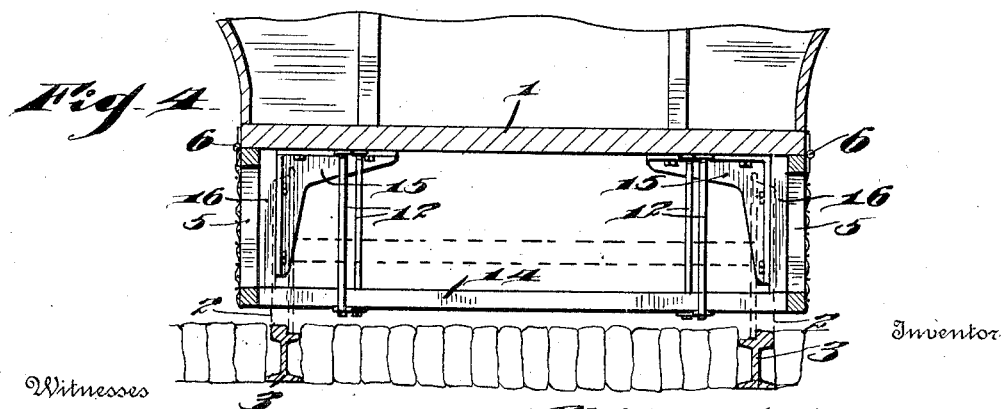

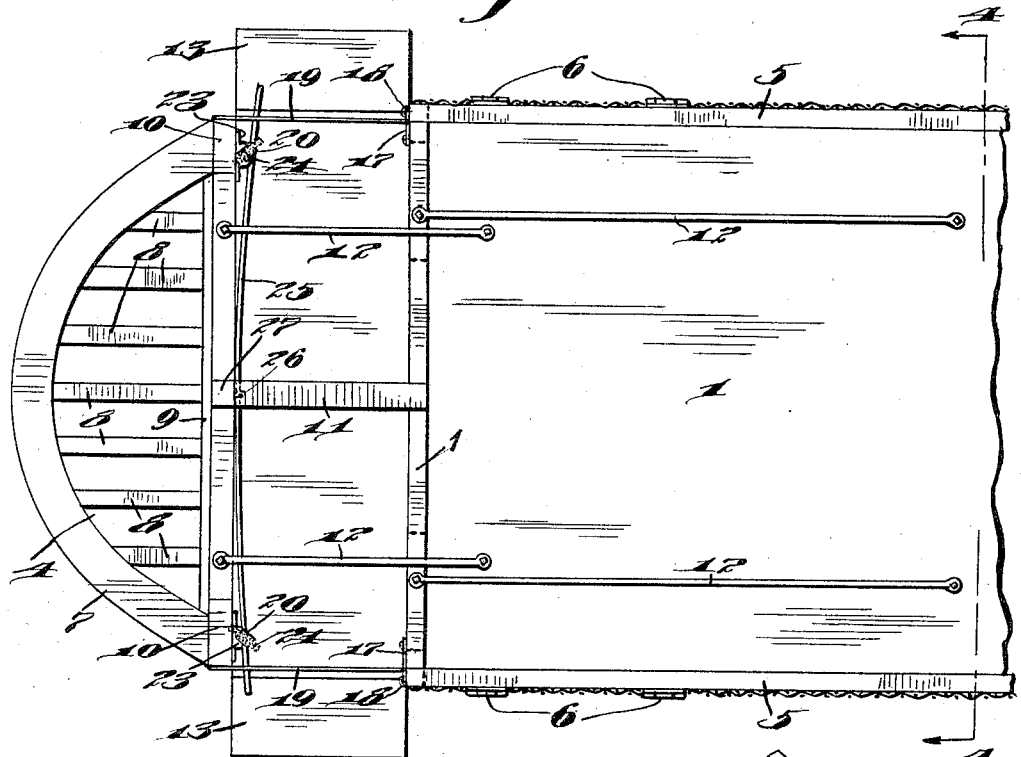

UNITED STATES PATENT OFFICE.

PHILIP F. MATTHEWS, OF PHILADELPHIA, PENNSYLVANIA.

CAR-FENDER.

998,788.

Specification of Letters Patent. Patented July 25, 1911.

Application filed October 6, 1910. Serial No. 585,624.

*To all whom it may concern:*

Be it known that I, PHILIP F. MATTHEWS, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a car with end and side fenders which so inclose the wheels as to render it practically impossible for a person to come in contact with the wheels with any part of the body or limbs.

A further object is to provide a car with an improved construction of side fenders which may be swung upward so as to allow access to the wheels or to the under portion of the car.

A further object is to provide improved brushes and mountings therefor, which brushes are adapted to sweep the rails and keep them clear of cartridges, or bombs that might be placed thereon, as well as to clean off snow, so as to allow the car to run in all kinds of weather.

With these and other objects in view, the invention consists in certain novel features of construction and combinations and arrangements of parts, as will be more fully hereinafter described and pointed out in the claim.

In the accompanying drawings: Figure 1, is a broken view in side elevation illustrating my improvements. Fig. 2, is a view in section on the line 2—2 of Fig. 1. Fig. 3, is a view in section on the line 3—3 of Fig. 1. Fig. 4, is a view in section on the line 4—4 of Fig. 5. Fig. 5, is an inverted plan view of one end of the car. Fig. 6, is a fragmentary view partly in longitudinal section illustrating one of the brushes and its mounting, and Fig. 7, is a detail perspective view of one of the brushes.

1, represents the body of a car and 2 the wheels supporting the same, adapted to run on the track 3. Secured to the car at both ends are what I term end fenders 4, and to the sides of the car, side fenders 5 are connected by hinges 6, connecting the upper edges of the fenders 5 with the body of the car, so that the side fenders may be thrown up to permit access to the wheels or the bottom of the car. These side fenders 5 preferably constitute frames having open-work wire netting thereon.

The end fenders 4 are made comparatively heavy and rigid, and constitute a curved buffer 7 connected by heavy inclined slats 8 with a cross bar 9 secured to the car body and to upright posts 10 at the sides of the car. These end fenders 4 are strengthened by a diagonal brace 11 which sustains the buffing action against the fender, and these end fenders are further strengthened by diagonal brace rods 12, secured to the bottom of the car.

13, 13 represent the car steps, and back of the steps at both ends of the car, transverse frames are located and comprise bars 14, which extend transversely below the car, and are secured by upright bars 16 to brackets 15 fixed to the car 1. I would have it understood that hereinafter when I refer to the term "transverse frame" I use this term to include bars 14, uprights 16, and brackets 15.

To prevent a person or any portion of his body from passing under the car below the step, a plurality of wires or rods 19 connect the upright members 16 of frames 14 with the posts 10 below the car step.

In constructing a car with fenders such as I have described, it is intended that the fenders shall extend down to a point within a few inches of the track, sufficiently far to render it impossible for anyone to project any portion of their body under the car to be run over by the wheels.

To keep the tracks clear of snow and dirt, and also to brush off any caps, bombs or other explosives that might be placed upon the track, I provide brushes as shown in Fig. 7. These brushes 20 are preferably elongated and have wire bristles 21, and are provided with vertical rods 22 preferably angular in cross section mounted to move vertically in brackets 23 on posts 10, the angular rods 22 moving in angular openings in the brackets 23, whereby any rotary movement of the brushes is prevented. The rods 22 are provided at intervals with notches 24 into which a transversely disposed spring rod 25 engages to hold the brushes at the desired vertical adjustment. The transverse rods 25 are preferably secured midway between their ends by staples 26 to hangers 27 depending from the car. This support of the spring rods allows the free ends of the rods to be moved out of the notches 24, so as to enable the brushes to be adjusted vertically.

As above stated, the brushes 20 are elongated, and they are located at an angle to the rails so as to brush to the outside of the track snow or any object on the rail, thus preventing the wheels from coming in contact with the same.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with a car body and depending posts at the ends of the car body, of rigid car fenders secured to said body and to said posts, inclined braces connecting said rigid fenders with the bottom of the car, transverse frames located back of the steps of the car, rods connecting said transverse frames with the posts and located below the steps, and side fenders hinged to the bottom of the car closing the space between the transverse frames at the front and rear ends of the car, whereby the wheels of the car are confined in the space inclosed by the side fenders, the end fenders, and the said rods, substantially as described.

In testimony whereof I have signed my name to this specification in the presence of two subscribing witnesses.

PHILIP F. MATTHEWS.

Witnesses:
C. R. ZIEGLER,
CHAS. E. POTTS.

---

Copies of this patent may be obtained for five cents each, by addressing the "Commissioner of Patents, Washington, D. C."